United States Patent [19]

Yoshida et al.

[11] Patent Number: 5,219,500
[45] Date of Patent: Jun. 15, 1993

[54] SILICON NITRIDE SINTERED BODY AND PROCESS FOR PREPARATION THEREOF

[75] Inventors: Makoto Yoshida; Masahiro Sato; Kazunori Koga; Kazumi Osamura; Shoji Kousaka; Tatsumi Maeda; Kiyoshi Yokoyama; Masafumi Matsunaka, all of Kokubu, Japan

[73] Assignee: Kyocera Corporation, Kyoto, Japan

[21] Appl. No.: 446,598

[22] Filed: Dec. 6, 1989

Related U.S. Application Data

[62] Division of Ser. No. 176,605, Apr. 1, 1988, Pat. No. 4,920,085.

[30] Foreign Application Priority Data

| Apr. 2, 1987 | [JP] | Japan | 62-82077 |
| Apr. 2, 1987 | [JP] | Japan | 62-82078 |
| Apr. 2, 1987 | [JP] | Japan | 62-87842 |
| May 9, 1987 | [JP] | Japan | 62-113104 |
| May 20, 1987 | [JP] | Japan | 62-124663 |
| Jun. 2, 1987 | [JP] | Japan | 62-138782 |
| Nov. 30, 1987 | [JP] | Japan | 62-218341 |
| Nov. 30, 1987 | [JP] | Japan | 62-304135 |

[51] Int. Cl.$^5$ ............................................. C04B 35/65
[52] U.S. Cl. ..................................... 264/65; 501/97; 501/98
[58] Field of Search ........................ 501/97, 98; 264/65

[56] References Cited

U.S. PATENT DOCUMENTS

4,351,787  9/1982  Martinengo et al. ................. 264/65
4,795,724  1/1989  Soma et al. ............................ 264/65

FOREIGN PATENT DOCUMENTS

0250153  12/1987  European Pat. Off. .
0108409  10/1978  Japan .
62-003073  1/1987  Japan .
56-2003077  1/1987  Japan .

*Primary Examiner*—James Derrington
*Attorney, Agent, or Firm*—Spensley Horn Jubas & Lubitz

[57] ABSTRACT

Disclosed is a silicon nitride sintered body comprising 85 to 99 mole % of $\beta$-Si$_3$N$_4$, 1 to 5 mole % as the oxide (M$_2$O$_3$) of at least one compound of an element (M) selected from the group consisting of Sc, Vb, Er, Ho and Dy and less than 10 mole % of excessive oxygen (O$_2$) based on the three components, wherein the excessive oxygen/M$_2$O$_3$ molar ratio is lower than 2.

6 Claims, 3 Drawing Sheets

SILICON NITRIDE SINTERED BODY AND PROCESS FOR PREPARATION THEREOF

This is a division of application Ser. No. 07/176,605, filed Apr. 1, 1988 now U.S. Pat. No. 4,920,085.

BACKGROUND OF THE INVENTION (1) Field of the Invention

The present invention relates to a silicon nitride sintered body having a high flexural strength at a high temperature and an excellent oxidation resistance, in which deviations of values of these characteristics are small, and a process for the preparation thereof. More particularly, the present invention relates to a silicon nitride sintered body in which the deviation of characteristics at a high temperature is controlled at the mass production, formation of a stain in a formed body is controlled and the oxidation resistance in a medium-temperature range (about 1000° C.) such as at the time of idling of an engine is improved, and a process for the preparation of this silicon nitride sintered body.

(2) Description of the Related Art

A sintered body composed of silicon nitride has mainly covalent bonds as bonds of atoms and is excellent in such characteristics as strength, hardness, thermal stability and chemical stability. Therefore, applications of this sintered body to engineering ceramics, especially gas turbines as heat engines have been tried and developed.

It is expected that the operation temperature of a heat engine will be elevated above 1000° C. with increase of the efficiency of the heat engine, and development of a material that can be used under this temperature condition is desired.

Various investigations have been made on the compositions of sintered bodies and sintering methods for obtaining sintered bodies excellent in high-temperature characteristics.

In connection with the composition, researches have been made especially on sintering aids. It is known that sintered bodies having good high-temperature characteristics can be obtained by addition of compounds of elements of the group IIIb of the periodic table and various oxides, but these sintering aids are still insufficient.

For example, U.S. Pat. No.: 4,280,850 teaches that the $Si_3N_4$—$Y_2O_3$—$SiO_2$ system is sintered to completely crystallize the grain boundary and improve the high-temperature strength. However, if the grain boundary is completely crystallized, since a vitreous phase is not present at all, the toughness (kic) is reduced and defects such as grinding scratches are easily formed, and a large deviation of the strength (flexural strength) is often caused.

U.S. Pat. No. 4,234,343 teaches that the $Si_3N_4$-$M_2O_3$—$SiO_2$ system is sintered with Sc, Al, Cr, Ti, (Mg+Zn) or (Ni+Zr). An element having a small ion radius is selected as M of $M_2O_3$. It is taught that if an element having a small ion radius is used, an $Si_3N_4$ sintered body having excellent high-temperature strength and excellent oxidation resistance can be obtained and a disilicate ($M_2Si_2O_7$) is formed in the grain boundary. However, the composition is $SiO_2$-rich and the amount of dispersed $SiO_2$ is increased during sintering. Accordingly, the sintering method is limited, and only the HP sintering method or the sealed HIP method can be practically adopted.

Moreover, U.S. Pat. No. 4,388,414 discloses a process for preparing a thermally stable ceramic sintered body having a high oxidation resistance by using $Y_2O_3$ in sintering the $Si_3N_4$—$M_2O_3$—$SiO_2$ system, and it is taught that the weight increase by oxidation is 1.1 $mg/cm^2$ in case of a grain boundary of wollastonite (K phase) or 0.25 $mg/cm^2$ in case of a grain boundary of YAM (J phase). However, this sintered body is defective in that stains are formed.

SUMMARY OF THE INVENTION

It is therefore a primary object of the present invention to provide a silicon nitride sintered body which is excellent in high-temperature characteristics such as the oxidation resistance at a high temperature and the flexural strength at a high temperature and in which the deviation of high-temperature characteristics is controlled at the mass production, formation of stains on the surface of the sintered body is controlled and the oxidation resistance at a medium temperature (about 1000° C.) such as at the time of engine idling is improved.

Another object of the present invention is to provide a process for the preparation of a silicon nitride sintered body having the above-mentioned characteristics.

Still another object of the present invention is to provide a process for the preparation of a silicon nitride sintered body having a high density and an excellent strength, especially an excellent high-temperature strength, which is advantageously applied to the production of a large-size or complicated-shape sintered body.

A further object of the present invention is to provide a process for the preparation of a silicon nitride sintered body, in which growth of a needle crystal is controlled in a low-temperature region at the time of sintering and the sintering property at a high temperature is improved so that the texture of the sintered body is made finer and densified.

A still further object of the present invention is to provide a silicon nitride sintered body, in which a high-density sintered body having improved flexural strength and toughness can be prepared.

In accordance with the present invention, there is provided a silicon nitride sintered body comprising 85 to 99 mole % of $\beta$-$Si_3N_4$, 1 to 5 mole % as the oxide ($M_2O_3$) of at least one compound of an element (M) selected from the group consisting of Sc, Yb, Er, Ho and Dy and less than 10 mole % of excessive oxygen ($O_2$) based on the three components, wherein the excessive oxygen/$M_2O_3$ molar ratio is lower than 2.

The sintered body of the present invention consists of grains of $Si_3N_4$ and a grain boundary, and this grain boundary contains a vitreous phase and at least one phase selected from the group consisting of YAM, apatite and wollastonite and the crystal phase of the grain boundary preferably consists solely of the YAM phase or consists of a major amount of the YAM phase and a minor amount of wollastonite and/or apatite. The grain boundary of this sintered body has a crystallinity not higher than 90%, preferably 30 to 90%.

This sintered body preferably contains 0.1 to 1.5 mole % as the oxide of a compound of an element of the group VIb of the periodic table, and the sintered body can contain up to 1 mole % as the oxide of Al and 0.1 to 2.5 mole % as the oxide of Y.

In accordance with one embodiment of the present invention, there is provided a process for the preparation of a silicon nitride sintered body, which comprises molding a mixed powder comprising as the main component a mixture comprising 45 to 70% by weight of silicon nitride powder, 20 to 40% by weight of silicon powder and 10 to 15% by weight of a compound of an element of the group IIIb of the periodic table, nitriding the silicon at a temperature of 1150° to 1400° C. under a nitrogen pressure of 2 to 10 atmospheres, and re-sintering the molded body in a nitrogen atmosphere maintained at 1700° to 2100° C. to increase the density.

In accordance with another embodiment of the present invention, there is provided a process for the preparation of a silicon nitride sintered body, which comprises molding a mixed powder comprising as the main component a mixture comprising 45 to 70% by weight of silicon nitride powder, 20 to 40% by weight of silicon powder, 10 to 15% by weight of a compound of the group IIIb of the periodic table and 1 to 1.5% by weight of a compound of the group VIb of the periodic table, nitriding said silicon at a temperature of 1150° to 1400° C. under a nitrogen pressure of 2 to 10 atmospheres, and re-sintering the molded body in a nitrogen atmosphere maintained at 1700° to 2100° C. to increase the density.

In accordance with still another embodiment of the present invention, there is provided a process for preparation of a silicon nitride sintered body having a density of at least 98% of the theoretical density, which comprises molding a mixture of silicon nitride powder having a $\beta$-conversion of at least 30% and an average particle size smaller than 1 $\mu$m and a sintering aid and sintering the molded body at a temperature higher than 1800° C. in a nitrogen-containing atmosphere having a nitrogen pressure higher than 1 atmosphere.

In accordance with a still further embodiment of the present invention, there is provided a process for the preparation of a silicon nitride sintered body, which comprises molding a powder comprising as the main component silicon nitride powder having such a relation between the $\beta$-conversion (%) (x) and the particle size ($\mu$m) (y) that the requirement of $$y = \frac{1}{250} x + 0.6$$

is satisfied in the range of $30 \leq x \leq 100$ and containing a sintering aid, and sintering the molded body at a temperature higher than 1800° C. in a non-oxidizing atmosphere having a pressure higher than 1 atmosphere.

DETAILED DESCRIPTION OF THE PREFERRED EMBODIMENTS

Figure 1:
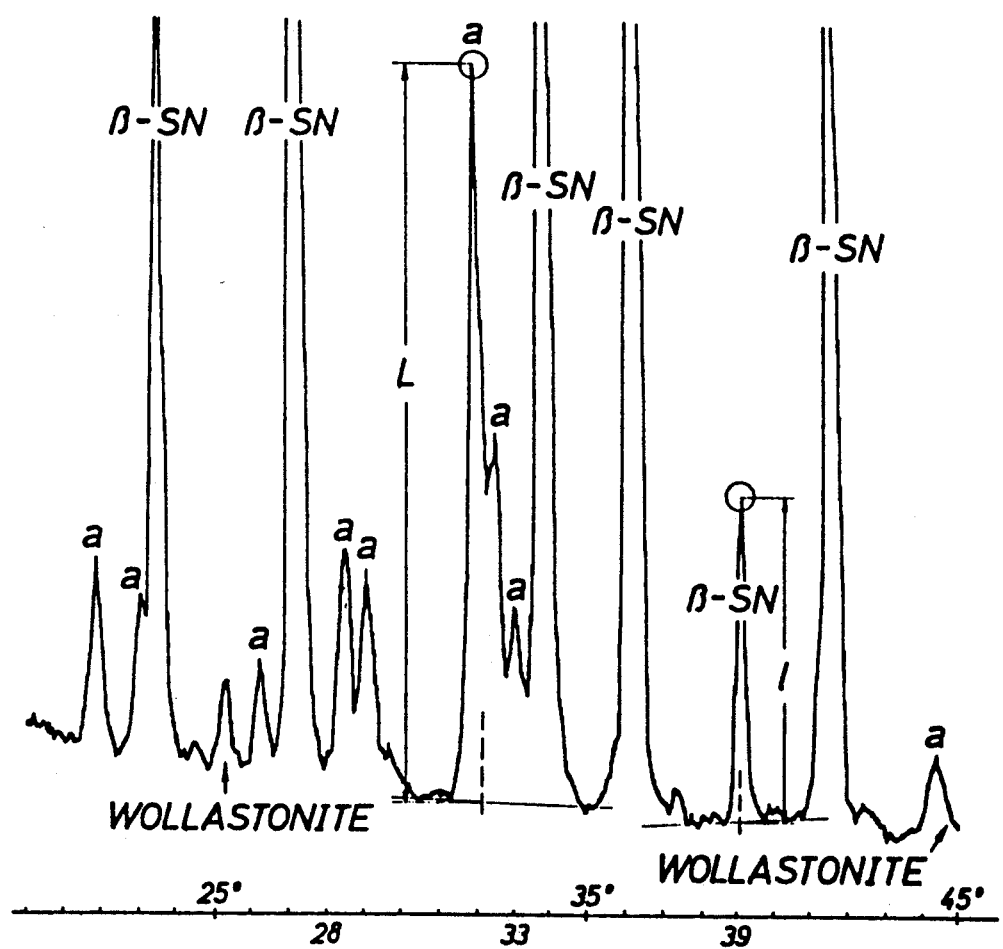
FIG. 1 is an X-ray diffraction diagram of an example of the $Si_3N_4$ sintered body of the present invention.

The periodic table referred to in the instant specification and appended claims is that of Chemical Abstracts Service (CAS).

If Sc, Yb, Er, Ho or Dy is expressed as M, each crystal phase has the following composition.

YAM (J phase): $Si_3N_4/SiO_2/4M_2O_3$ or $Y_4Si_2O_7N_2$
wollastonite (K phase): $Si_3N_4/SiO_2/2M_2O_3$ or $MSiO_2N$
apatite (H phase): $Si_3N_4/4SiO_2/5M_2O_3$ or $M_{10}Si_7O_{23}N_4$ melilite (M phase): $Si_3N_4/Y_2O_3$ Sintered Body The sintered body of the present invention comprises 85 to 99 moles % of $\beta$-$Si_3N_4$, 1 to 5 moles % as the oxide ($M_2O_3$) of at least one compound of an element (M) selected from the group consisting of Sc, Yb, Er, Ho and Dy and less than 10 mole % of excessive oxygen (amount of oxygen calculated by subtracting the amount of oxygen of $M_2O_3$ from the total amount of oxygen in the sintered body) based on the three components, and by setting the excessive oxygen/$M_2O_3$ molar ratio at a level lower than 2, the deviation of the characteristics is controlled and excellent high-temperature characteristics can be obtained.

Each of Sc, Yb, Er, Ho and Dy used in the present invention is an element of the group IIIb of the periodic table having a relatively small ion radius.

These elements react with $SiO_2$ and/or $Si_3N_4$ to form a high-melting-point compound in the grain boundary of $Si_3N_4$. A high-melting-point compound containing a metal element as described above is characterized in that the compound is excellent over high-melting-point compounds of other elements of the group IIIb of the periodic table. The present invention is based on the novel finding that if compounds of these elements are used as the sintering aid, the sintering property is stabilized and the deviation of the characteristics can be controlled at the mass production. In the case where $Y_2O_3$ heretofore used most popularly used as the compound of an element of the group IIIb of the periodic table is used as the sintering aid, the characteristics are good on the average, but stains are often formed on the surface of the sintered body or in the interior thereof probably owing to segregation or the like of the sintering aid component and it is difficult to obtain a homogeneous composition. On the other hand, in case of compounds of the above-mentioned elements, occurrence of this undesirable phenomenon is controlled and a sintered body having a homogeneous composition is obtained. It is construed that the reason is that the compounds show a high diffusion coefficient at the time of sintering because of a relatively small ion radius and the heterogeneous distribution of ions in the sintered body is moderated.

According to the present invention, the composition of the sintered body is set so that the sintered body comprises 85 to 99 mole %, preferably 88 to 95 mole %, of $\beta$-$Si_3N_4$, and 1 to 5 mole %, especially 1.5 to 3 mole %, as the oxide ($M_2O$) of at least one compound of a metal (M) selected from the group consisting of Sc, Yb, Er, Ho and Dy based on the three components. If an oxide of the above-mentioned metal is used, in the sintered body oxygen is contained in an amount a little larger than the stoichiometric amount of oxygen to be coupled with the metal element. This is due to oxygen unavoidably contained in the starting $Si_3N_4$ powder. In the present invention, it is important that the amount of excessive oxygen ($O_2$) should be less than 10 mole %, especially less than 6 mole %, and the excessive oxygen/$M_2O_3$ molar ratio should be lower than 2, especially lower than 1.8. If these structural requirements are satisfied, a silicon nitride sintered body having excellent high-temperature characteristics can be obtained without deviation of the characteristics.

The reasons for limiting the composition in the above-mentioned range will now be described. If the amount of $\beta$-Si$_3$N$_4$ is lower than 85 mole % or the amount of the compound of the element of the group IIIb exceeds 5 mole %, the amount of the glass component is increased and the high-temperature strength and oxidation resistance are degraded. If the amount of $\beta$-Si$_3$N$_4$ exceeds 99 mole % or the amount of the compound of the element of the group IIIb is smaller than 1 mole %, sintering becomes insufficient. If the amount of excessive oxygen is 10 mole % or more or the excessive oxygen/M$_2$O$_3$ molar ratio is 2 or more, the high-temperature characteristics are degraded.

The sintered body of the present invention consists of Si$_3$N$_4$ grains and a grain boundary, and this grain boundary comprises a glass phase and at least one phase selected from the group consisting of YAM, apatite and wollastonite. Namely, disilicate M$_2$Si$_2$O$_7$ is not present in the grain boundary of the sintered body of the present invention. Nevertheless, this sintered body is excellent in the oxidation resistance and flexural strength at high temperatures. In a typical instance of the sintered body of the present invention, the grain boundary comprises a glass phase and a crystal phase, and the crystal phase consists solely of a YAM phase or consists of a major amount of a YAM phase and a minor amount of wollastonite and/or apatite.

The grain boundary of the sintered body of the present invention has a crystallinity not higher than 90%, especially 30 to 90%, as determined according to the method described below.

Referring to the X-ray diffraction diagram (FIG. 1), the diffraction peak by crystallization of the sintering aid is observed at $2\theta = 28° - 33°$. The amount of the crystal present in the grain boundary is estimated by the intensity ratio between the diffraction peak based on the crystallization of the grain phase and the diffraction peak of $\beta$-silicon nitride, and the crystallinity of the grain boundary of the sintered body is determined.

Crystallized products of grain boundary compositions comprising an oxide of an element of the group IIIb, silicon oxide and silicon nitride are synthesized by using a completely crystallized grain boundary product as the standard. Products having a desired composition are synthesized by solid phase reaction conducted at 1600° C. under N$_2$ pressure of 2000 atmospheres for avoiding a change of the composition by reaction and decomposition as much as possible. By the X-ray diffractometry, it is confirmed that these synthesis products are composed of a crystal phase, and they are pulverized and mixed with $\beta$-silicon nitride so that the content is 5, 10 or 15% by weight, whereby standard samples are prepared. With respect to each of these standard samples, the relation between the intensity ratio of the peak at $2\theta = 32°$ (apatite: 10Er$_2$O$_3$. 9SiO$_2$. Si$_3$N$_4$) to the peak at $2\theta = 39°$ ($\beta$-Si$_3$N$_4$) and the mixing ratio of the apatite crystal is shown in FIG. 2.

Figure 2:
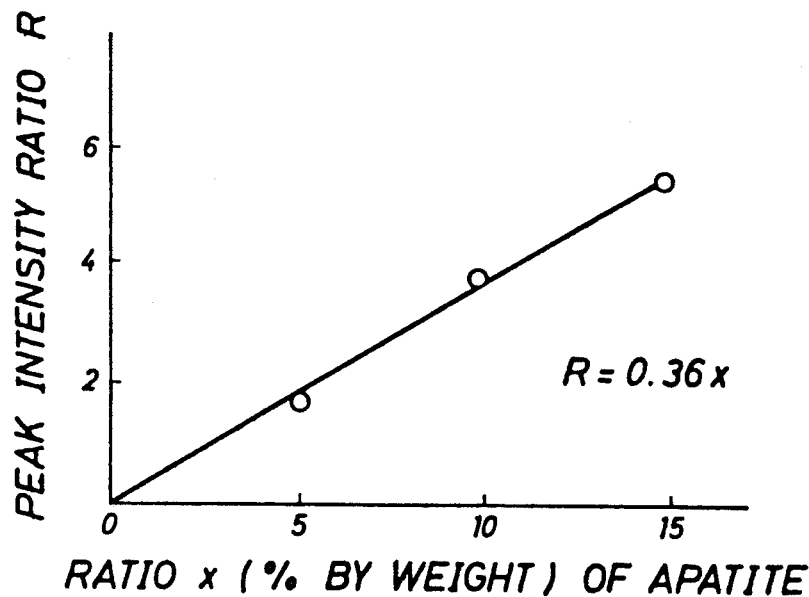
FIG. 2 is a graph illustrating the relation between the peak ratio (R) and the composition of the grain boundary crystal.

In the graph of FIG. 2, in the case where a completely crystalline grain boundary is contained, the ratio of the grain boundary crystal phase can be determined from the peak intensity ratio. The difference between the so-determined value and the amount estimated based on the assumption that all of the element of the group IIIb added to the actual sintered body is converted to apatite is deemed to be a glass phase.

For example, in case of Er$_2$O$_3$, if the amount added of the oxide of the element of the group IIIb is x% by weight, the ratio of the entire apatite phase is 1.18x%, as indicated below:

$$\frac{10Er_2O_3.9SiO_2.Si_3N_4}{10Er_2O_3} \times Er_2O_3(\% \text{ by weight}) = \frac{x}{1.18 \times Er_2O_3(\% \text{ by weight})}$$

When x is 8 (corresponding to 3 mole %), the ratio of the entire formed apatite phase is 9.4% (28×1.18). From the graph of FIG. 2, at this time, the peak intensity ratio R is 3.37 (R=0.36×9.4). The actually measured value R is 2.26, and the amount of the remaining glass phase is 33%, as indicated below:

$$1 - \frac{2.26}{3.37} = 0.33$$

The Si$_3$N$_4$ sintered body of the present invention is characterized in that the normal-temperature flexural strength (4-point bending flexural strength) is at least 60 kg/mm$^2$, the high-temperature flexural strength (4-point bending flexural strength) at 1400° C. is at least 45 kg/mm$^2$, and the amount increased by oxidation at a high temperature (1400° C. ×24 hours) is smaller than 0.3 mg/cm$^2$, and the sintered body of the present invention is excellent in the high-temperature flexural strength and oxidation resistance. The sintered body of the present invention is especially excellent in the medium-temperature oxidation resistance. Namely, the amount increased by oxidation at a medium temperature (1000° X ×100 hours) is smaller than 0.2 mg/cm$^2$, especially 0.14 to 0.16 mg/cm$^2$.

The oxidation behavior of the sintered body of the Si$_3$N$_4$—M$_2$O$_3$—SiO$_2$ system at a medium temperature (1000° C.) or a high temperature (1400° C.) has the following characteristics according to the difference of the crystal grain boundary phase composition. (It is supposed that excessive oxygen is present in the form of SiO$_2$.) In the medium temperature region (about 1000° C.), M-Si-ON glass and/or its crystal is converted to cristobalite or metal-silicate by oxidation. However, in this temperature region, a sufficiently dense glass film is not formed but an oxidation film becomes porous and oxidation of the sintered body is advanced through pores. Accordingly, if the sintered body is exposed to the temperature of this region for a long time, drastic degradation of the strength and corrosion are caused.

In contrast, in the high temperature region (about 1400° C.), a dense vitrious and/or crystalline protecting film is formed on the surface of the sintered body, and advance of the oxidation of the sintered body is prevented. Accordingly, the oxidation behavior in the high temperature region is extremely different from the oxidation behavior in the medium temperature region, as shown in FIG. 3.

Figure 3:
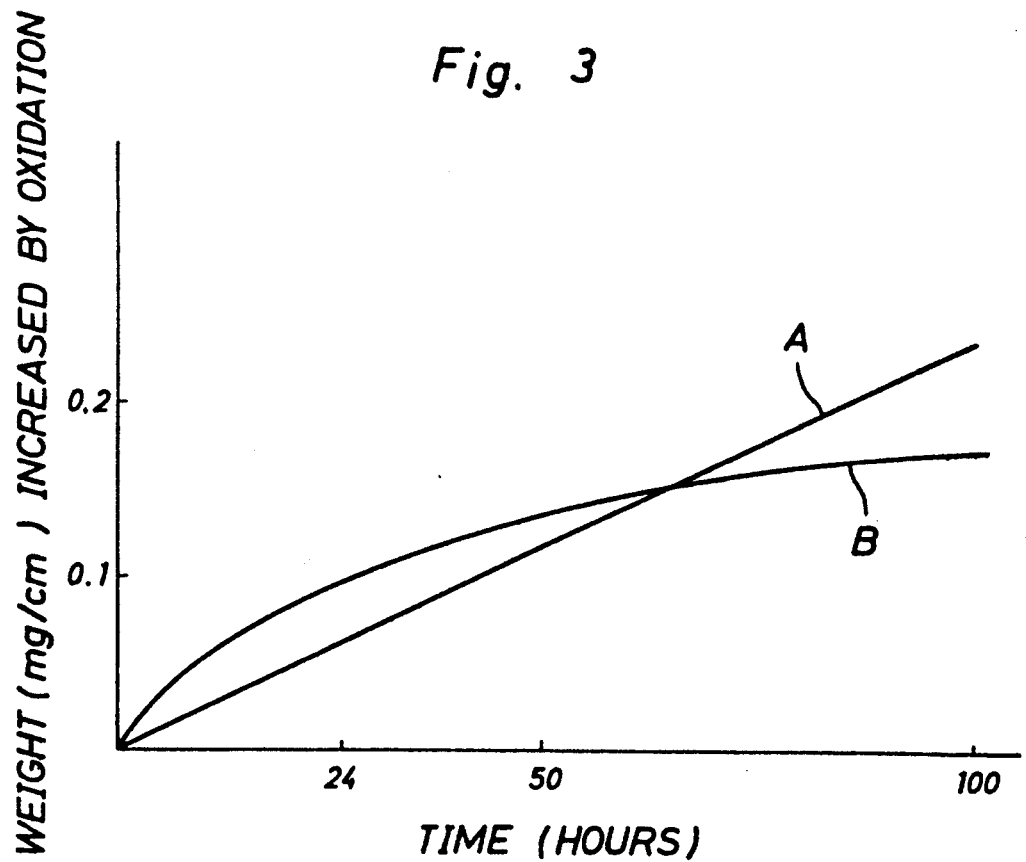
FIG. 3 is a graph illustrating the weight increases of $Si_3N_4$ sintered bodies at 1000° C. and 1400° C.

FIG. 3 shows the weight increase by oxidation with the lapse of time, and line A indicates the oxidation behavior at 1000° C. and line B indicates the oxidation behavior at 1400° C.

When the sintered body of the present invention is used for a high-temperature heat engine such as a gas turbine, the sintered body of the present invention shows great merits. Namely, the oxidation resistance and strength are high in the high temperature region at the high-speed rotation, and the oxidation resistance and strength are high in the medium temperature region at the idling or the like. The reason has not been completely clarified, but it is estimated that the above effects may be due to the $SiO_2$-rich glass phase present in addition to the crystal phase of the grain boundary or the crystal phase of a specific rare earth element compound.

The $Si_3N_4$ sintered body of the present invention contains 0.1 to 1.5 mole %, as the oxide, of at least one compound of an element selected from the group consisting of elements of the group VIb of the periodic table, such as Cr, W and Mo. By incorporation of a compound of an element of the group VIb of the periodic table, the high-temperature flexural strength (1400° C.) can be increased to a level of at least 59 kg/mm², and the amount increased by oxidation at a high temperature (1400° C.×24 hours) can be reduced below 0.15 mg/cm². Moreover, an even black color can be imparted to the sintered body. If the amount of this component is smaller than 0.1 mole %, the improvement of the oxidation resistance is insufficient, and if the amount of this component exceeds 1.5 mole %, the normal temperature flexural strength is degraded. Tungsten oxide ($WO_3$) is preferred as the compound of the element of the group VIb of the periodic table.

The $Si_3N_4$ sintered body of the present invention can contain up to 1 mole %, especially up to 0.6 mole %, as the oxide, of Al. According to this embodiment of the present invention, by incorporation of an Al compound, the effect of lowering the melting point of the liquid phase at the sintering is very high and the sintering property is greatly stabilized, and the deviation of the characteristics can be controlled at the mass production. After the sintering has been advanced through the liquid phase, by the reaction between the Al compound, for example, $Al_2O_3$, and $Si_3N_4$, a solid solution of the Si-Al-O-N system is partially formed or by the reaction between the Al compound and the above-mentioned compound of the element (M) of the group IIIb, a solid solution of the Si-M-Al-O-N system is partially formed. Accordingly, Al is left in the grain boundary phase, and therefore, the sintering property can be improved without degradation of the high-temperature characteristics. Moreover, $Al_2O_3$ has an effect of stabilizing the sintering property, and reduces the deviation of the characteristics at the mass production. Incidentally, the amount (as the oxide) of Al exceeds 1 mole %, the strength and oxidation resistance at high temperature exceeding 1300° C. are drastically degraded.

The sintered body of the present invention contains 0.1 to 2.5 mole %, as the oxide, of a compound of Y. According to experiments made by us, it has been confirmed that if the compound of the metal element (M) is added, the strength and oxidation become sufficient, but the stability of the characteristics tends to be insufficient. According to this embodiment of the present invention, by using a small amount of a compound of Y as the additive in combination with the compound of the metal element (M), the deviation of the characteristics is controlled. However, if the amount added of the compound of Y is to large, color unevenness is often caused on the surface of the sintered body at the sintering. If the amount of the compound of Y is smaller than 0.1 mole %, the control of the deviation is not sufficient, and if the amount of the compound of Y exceeds 2.5 mole %, the deviation of the flexural strength at room temperature to a high temperature increases owing to the change of the composition and local oxidation is often caused. It is preferred that the ratio ($M_2O_3/Y_2O_3$) of the amount as the oxide ($M_2O_3$) of at least one element selected from the group consisting of Sc, Yb, Er, Ho and Dy to the amount as the oxide ($Y_2O_3$) of Y be from 0.4 to 50, especially from 0.5 to 30.

Preparation Process

In the present invention, either $\alpha$—$Si_3N_4$ or $\beta$—$Si_3N_4$ can be used as $Si_3N_4$ powder for the production of a silicon nitride sintered body. However, it is preferred that $Si_3N_4$ powder having a BET specific surface area of at least 10 m²/g and an oxygen content lower than 3% by weight to used.

The $Si_3N_4$ powder is mixed with the compound of the metal selected from the group consisting of Sc, Yb, Er, Ho and Dy so that in the sintered body, the content of $\beta$—$Si_3N_4$ is 85 to 99 mole % and the content as the oxide of the metal element is 1 to 5 mole %, and if desired, the compound of the element of the group VIb of the periodic table is incorporated in an amount of 0.1 to 1.5 mole % as the oxide, the Al compound is incorporated in an amount of up to 1 mole % as the oxide or the compound of Y is incorporated in an amount of 0.1 to 2.5 mole % as the oxide. At the mixing step, the compounds of the additive components may be oxides, carbides, nitrides, oxynitrides, borides, nitrates, carbonates, acetates and oxalates. Among them, oxides are especially preferred.

After the making, the mixed powder is mixed with an appropriate binder and the like, the mixture is formed into a desired shape by a known molding method, for example, press molding, cast molding, extrusion molding or injection molding, and the molded body is sintered. The sintering is carried out at a sintering temperature of 1600° to 2300° C. in a nitrogen-containing non-oxidizing atmosphere such as nitrogen gas or a mixed gas of nitrogen gas and hydrogen gas or an inert gas.

As the sintering method, there can be mentioned the atmospheric pressure sintering method, the gas pressure sintering method, the hot hydrostatic pressure sintering method (HIP) and the hot press sintering method (HP).

Incidentally, in the present invention, the amount of excessive oxygen in the sintered body can be controlled according to the sintering conditions. Excessive oxygen is ordinarily oxygen bonded to an impurity unavoidably contained in the starting powder, and excessive oxygen is contained in the form of $SiO_2$ in $Si_3N_4$ powder. Since this oxygen is present as a compound having a relatively low melting point, if the sintering is carried out at a temperature higher than 1900° C. at the sintering step, the low-melting-point compound can be volatilized. Accordingly, the amount of excessive oxygen can be substantially controlled by the time of the sintering conducted at a high temperature exceeding 1900° C.

The sintered body of the present invention can also be prepared according to the following novel processes.

Process I

This process comprises molding a mixed powder comprising as the main component a mixture comprising 20 to 40% by weight of silicon powder, 45 to 70% by weight of silicon nitride powder, 10 to 15% by weight of a compound of an element of the group IIIb of the periodic table and, if desired, 1 to 1.5% by weight of a compound of an element of the group VIb of the periodic table, nitriding silicon in the molded body at a temperature of 1150° to 1400° C. under a nitrogen pressure of 2 to 10 atmospheres, and re-sintering the nitride in a nitrogen atmosphere maintained at 1700° to 2100° C.

It is preferred that in the metallic silicon powder used in the present invention, the purity be at least 99% and the particle size be smaller than 50 μm. Either α-type silicon nitride or β-type silicon nitride can be used as the silicon nitride powder, and it is preferred that the average particle size be smaller than 0.6 μm. A known oxide is preferably used as the compound of the element of the group IIIb of the periodic table as the sintering aid. For example, $Y_2O_3$, $CeO_2$, $La_2O_3$ and $Yb_2O_3$ can be used, and among them, $Yb_2O_3$ is especially preferred from the viewpoint of the sintering stability. The above-mentioned three components are mixed at the above-mentioned specific mixing ratio. The reasons for this lamination are described below. If the amount of the silicon nitride powder is smaller than 45% by weight or the amount of silicon exceeds 40% by weight, it is difficult to completely nitride the silicon, and the residual silicon has bad influences on the mechanical characteristics such as the strength. If the amount of the silicon nitride powder exceeds 70% by weight or the amount of silicon is smaller than 20% by weight, shrinkage becomes large at the sintering and it is difficult to obtain a sintered body having a desired shape. If the amount of the compound of the element of the group IIIb of the periodic table is smaller than 10% by weight, sintering is insufficient and no satisfactory strength can be attained. If the amount of the compound of the group IIIb of the periodic table exceeds 15% by weight, the mechanical strength is degraded.

The mixed powder having the above-mentioned composition is formed into a desired shape according to a known molding method such as press molding, cast molding, extrusion molding or injection molding, and the molded body is transferred to the nitriding step.

In the present invention, the nitriding step is very important, and the nitriding step is characterized in that the nitriding is carried out at 1150° to 1400° C. under a nitrogen pressure of 2 to 10 atmospheres. The reason for limitation of the nitriding temperature is that if the temperature is lower than 1150° C., the nitriding reaction is not advanced and if the temperature is higher than 1400° C., silicon is dissolved out before it is nitrided. If the nitrogen gas pressure is lower than 2 atmospheres, for example, if the nitriding reaction is carried out under atmospheric nitrogen pressure, the nitriding speed is low, and as is apparent from the results of experiments shown below, metallic silicon is substantially left. On the other hand, if the nitrogen pressure exceeds 10 atmospheres, when closed cells are formed in the molded body at the nitriding step, a high-pressure gas is trapped in these closed cells and therefore, densification is inhibited at the subsequent re-sintering step and a sintered body having a high strength cannot be obtained. According to the present invention, it is sufficient if the nitriding reaction is carried out for 15 to 50 hours under the above-mentioned conditions, though the nitriding time differs to some extent according to the size of the molded body. If desired, the nitrogen gas of the atmosphere may be fluidized to effect substitution of the gas. According to this nitriding process, a nitriding ratio higher than 90% can be realized.

After the nitriding step, the sintered body is re-sintered. The re-sintering is carried out in a nitrogen atmosphere maintained at 1700° to 2100° C. A known method such as atmospheric pressure sintering, hot press sintering, gas pressure sintering or hot hydrostatic pressure sintering can be adopted as the sintering means. Among these methods, gas pressure sintering is preferred for improving the high-temperature strength. In the gas pressure sintering method, the nitrogen gas pressure is set at a level higher than the equilibrium nitrogen pressure of thermal decomposition of silicon nitride at the sintering temperature. At this re-sintering step, silicon nitride reacts with the sintering aid to advance densification, and finally, a sintered body having a density of at least 95% of the theoretical density is obtained.

Process II

This process comprises molding a mixture of silicon nitride having a β-conversion of at least 30% and an average particle size smaller than 1 μm and sintering the molded body at a temperature higher than 1800° C. in a nitrogen-containing atmosphere having a nitrogen pressure higher than 1 atmosphere.

It is known that there are two densification processes in the sintering of α-$Si_3N_4$. In the first process occurring in the temperature region of from 1600° to 1800° C., it is considered that densification by the liquid phase formed by the sintering aid is caused simultaneously with transition to β-$Si_3N_4$ from α-$Si_3N_4$. Since both of transition and densification are simultaneously caused, growth of needle crystal is simultaneously advanced. In the normal pressure sintering method or the hot press sintering method, since the temperature is elevated to a level higher than 1800° C., there is a risk of decomposition of silicon nitride. Accordingly, the sintering should be completed only by the first densification process, and hence, the sintering aid should be used in a large quantity. The second process of densification occurs at a temperature higher than 1800° C. under pressurization by nitrogen, and it is considered that the liquid phase of the sintering aid reacts with β-$Si_3N_4$ and densification is advanced by dissolution and precipitation of $Si_3N_4$ particles.

We made research with a view to solving the above-mentioned problem, and as the result, it was found that if starting powder containing a large quantity of β-$Si_3N_4$ is sintered at a high temperature exceeding 1800° C. under pressurization by a nitrogen gas, the growth of needle crystals in the first densification process is controlled and only by the second densification process, a highly densified sintered body having an excellent high-temperature strength can be obtained. Namely, in the case where a molded body comprising a starting silicon nitride powder containing a large quantity of β-$Si_3N_4$ and a sintering aid is sintered, since β-$Si_3N_4$ is used from the start, the conventional transition step conducted at a temperature lower than 1850° C. is substantially unnecessary. With elevation of the temperature, in the low temperature region below 1850° C., a liquid phase is formed by the sintering aid and densification is advanced, but the larger is the amount of β-$Si_3N_4$, the more controlled is the growth of grains at low temperatures. Accordingly, the particle size of the starting powder is substantially maintained in β-$Si_3N_4$ until the high temperature region above 1850° C. is reached. In the case where α-$Si_3N_4$ is contained in the starting material, since the growth of grains in the low temperature region depends on the retention time at low temperatures, the growth of grains can be controlled by shortening the retention time. Namely, the temperature can be elevated to a high level of 1850° C., while keeping the state of fine $\beta$-Si$_3$N$_4$ by controlling the growth of grains or keeping the state of a mixture of fine $\beta$-Si$_3$N$_4$ and $\beta$-Si$_3$N$_4$ grown by transition of grains to the $\beta$-phase from the $\alpha$-phase during the temperature elevation. In the high temperature region, $\beta$-Si$_3$N$_4$ reacts with the liquid phase and densification is advanced by dissolution and precipitation of $\beta$-Si$_3$N$_4$ grains, and simultaneously, transition of remaining $\alpha$-Si$_3$N$_4$ to $\beta$-Si$_3$N$_4$ is advanced. Finally, a very dense sintered body comprising fine $\beta$-Si$_3$N$_4$ crystal grains and a grain boundary composed mainly of the sintering aid component is formed.

It is preferred that in the silicon nitride powder used in the present invention, the content of $\beta$-Si$_3$N$_4$ be at least 30% by weight, especially at least 40% by weight, the average particle size be smaller than 1 $\mu$m, especially smaller than 0.7 $\mu$m, and the powder be composed of fine particles having a spherical or indeterminate shape. If the content of $\beta$-Si$_3$N$_4$ is lower than 30% by weight, the growth of needle crystals in the low temperature region is extreme, and the objects of the present invention cannot be attained. If the average particle size exceeds 1 $\mu$m, densification becomes difficult.

Furthermore, it is preferred that the total oxygen content in the starting powder be 2 to 0.5% by weight and the impurity content be lower than 0.5% by weight.

As the sintering aid, there can be used at least one member selected from the group consisting of oxides, nitrides and oxynitrides of elements of the group IIIb of the periodic table such as scandium, yttrium and lanthanide elements, oxides and nitrides of elements of the group IIa of the periodic table, such as Be, Mg, Ca Sr and Ba, and Al$_2$O$_3$, AlN, SiO$_2$, ZrO$_2$, ZrN and HfO$_2$.

The sintering aid is homogeneously mixed with the silicon nitride powder in an amount of 0.1 to 20% by weight based on the total amount, and the mixture is pulverized and molded in a desired shape by the known means such as cast molding or injection molding. The molded body is transferred to the sintering step.

At the sintering step, the sintering is carried out at a temperature higher than 1800° C., especially 1850° to 1950° C., in an atmosphere having a nitrogen pressure of at least 1 atmosphere. More specifically, it is necessary that the sintering temperature and nitrogen gas pressure should be set so that the nitrogen pressure is higher than the equilibrium pressure of decomposition of silicon nitride at the set sintering temperature. Preferably, oxygen or SiO$_2$ is introduced into the atmosphere, and the gas pressure is set at a level higher the equilibrium vapor pressure of SiO in the reaction of silicon nitride with SiO at the sintering temperature, that is, the reaction represented by the following formula (1):

$$Si_3N_4 + 3SiO_2 \rightarrow 6SiO \uparrow + 2N_2 \uparrow \qquad (1)$$

By this procedure, the pressure of the atmosphere can be reduced, and inhibition of densification by trapping of a high-pressure gas in pores of the sintered body at the sintering can be prevented. Introduction of SiO is accomplished by forming SiO at the sintering step by arranging mixed powder of silicon nitride and SiO$_2$, SiO$_2$ powder, SiO powder or mixed powder of Si powder and SiO$_2$ powder in a sintering furnace together with the molded body.

In connection with the sintering pattern, in the case where the amount of $\beta$-Si$_3$N$_4$ is smaller than 30% by weight, if the temperature is elevated to 1800° C. at a stroke, because of abrupt growth of grains by conversion of the $\alpha$-phase to the $\beta$-phase, densification becomes difficult. If $\beta$-Si$_3$N$_4$ is contained in an amount of 30% by weight or more, the temperature can be substantially continuously elevated to 1800° C. or higher from the start of the temperature elevation without abrupt growth of grains, and hence, the sintering time can be much shortened.

The finally obtained sintered body consists of a phase of crystal grains having a $\sigma$-Si$_3$N$_4$ content of at least 90% and a phase of the grain boundary, and the grain boundary phase can be a vitreous phase or crystal phase.

According to the present invention, a dense sintered body having a fine structure can be obtained by the above-mentioned simple sintering, and the crystal grain phase of the sintered body has an average particle size of 1 to 10 $\mu$m and an aspect ratio of 1 to 10.

Process III

This process comprises molding a powder comprising as the main component silicon nitride powder having such a relation between the $\beta$-conversion (%) (x) and the particle size ($\mu$m) (y) that the requirement of $$y \leq \frac{1}{250} x + 0.6$$

is satisfied in the range of $30 \leq x \leq 100$ and containing a sintering aid, and sintering the molded body at a temperature higher than 1800° C. in a nonoxidizing atmosphere having a pressure higher than 1 atmosphere.

Figure 4:
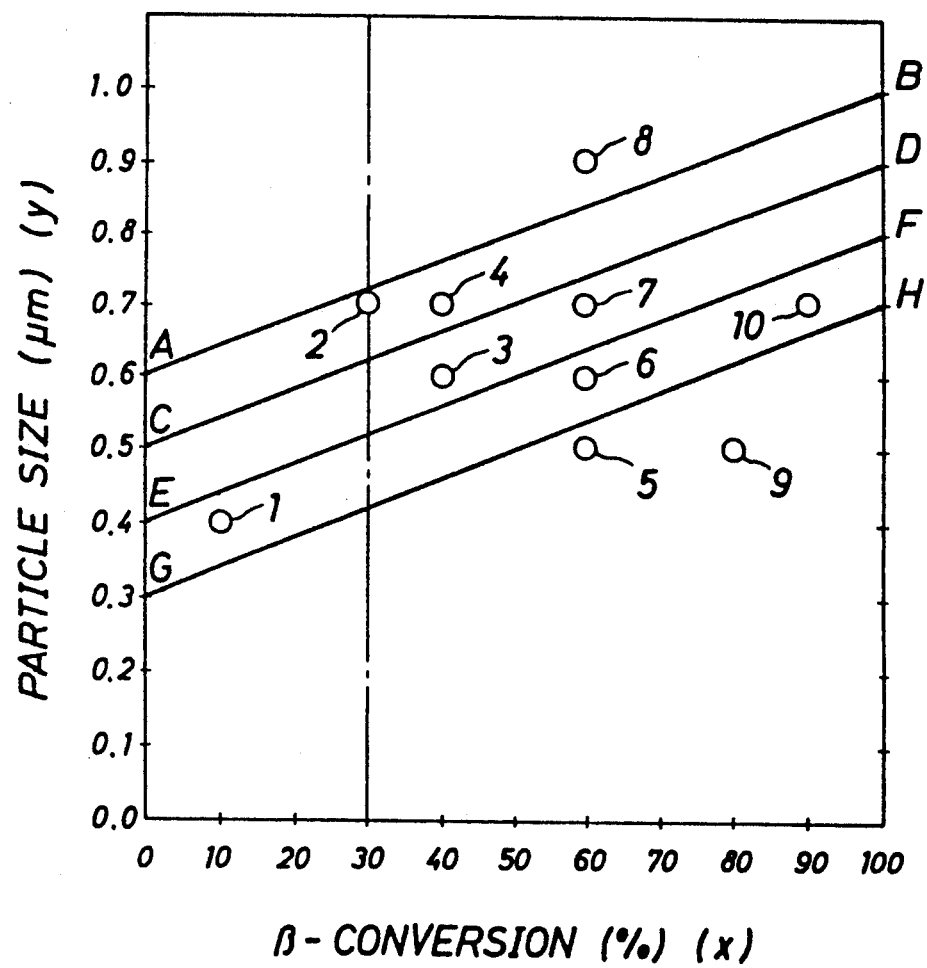
FIG. 4 is a graph illustrating the relation between the $\beta$-conversion (%) (x) and the particle size ($\mu$m) (y) in the starting silicon nitride powder.

In the case where a molded body of a mixed powder comprising silicon nitride powder containing a large amount of $\beta$-Si$_3$N$_4$, that is, silicon nitride powder in which the $\beta$-convention is in the range of $30\% \leq x \leq 100\%$, and a sintering aid is sintered, since $\beta$-Si$_3$N$_4$ is used from the initial stage, the conventional transition step conducted at a temperature lower than 1850° C. becomes substantially unnecessary. With elevation of the temperature, a liquid phase is formed by the sintering aid in the low temperature region below 1850° C. and densification is advanced, but the higher is the content of $\beta$-Si$_3$N$_4$, the more controlled is the growth of grains at low temperatures. Accordingly, $\beta$-Si$_3$N$_4$ regains substantially the same particle size as that of the starting powder until the temperature reaches the high temperature region above 1850° C. It has been generally considered that increase of the $\beta$-conversion results in degradation of the flexural strength and toughness. However, as the result of experiments made by us, it has been confirmed that in starting silicon nitride powder having a high $\beta$-conversion, the finer is the particle size, the more improved are the flexural strength and toughness. The relation between the $\beta$-conversion (%) (x) and the particle size ($\mu$m) (y) is shown in FIG. 4. As is seen from FIG. 4, in the region where the $\beta$-conversion (%) (x) is 30 to 100%, the above relation is expressed by the function of

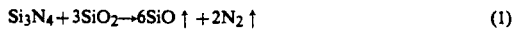

$$y = \frac{1}{250} x + a,$$

and as the value of a becomes small, the flexural strength and toughness tend to increase. Accordingly, in the present invention, it is preferred that the β-conversion be in the range of $30 \leq x \leq 100$, and the relation between the β-conversion (%) (x) and the particle size (μm) (y) be below the line segment $$(A - B)\left( y \leq \frac{1}{250} x + 0.6 \right),$$

especially below the line segment $$(C - D)\left( y \leq \frac{1}{250} x + 0.5 \right),$$

particularly especially below the line segment $$(E - F)\left( y \leq \frac{1}{250} x + 0.4 \right),$$

most especially below the line segment $$(G - H)\left( y \leq \frac{1}{250} x + 0.3 \right).$$

If this requirement is not satisfied, a silicon nitride sintered body having high flexural strength and toughness cannot be obtained. If the content of β-Si₃N₄ is lower than 30% by weight, the growth of needle crystals in the low temperature region is increased, and the objects of the present invention cannot be attained.

It is preferred that the total oxygen content in the starting powder be 2 to 0.5% by weight, and the impurity concentration be lower than 0.5% by weight.

As the sintering aid, there can be used at least one member selected from the group consisting of oxides, nitrides and oxynitrides of elements of the group IIIb of the periodic table such as scandium, yttrium and lanthanide elements, oxides and nitrides of elements of the group IIa of the periodic table, such as Be, Mg, Ca, Sr and Ba, and Al₂O₃. AlN, SiO₂, ZrO₂, ZrN and HfO₂.

The sintering aid is homogeneously mixed with the silicon nitride powder in an amount of 0.1 to 20% by weight based on the total amount, and the mixture is pulverized and molded in a desired shape by the known means such as cast molding or injection molding. The molded body is transferred to the sintering step.

At the sintering step, the sintering is carried out at a temperature higher than 1800° C., especially 1850° to 1950° C., in an atmosphere having a nitrogen pressure of at least 1 atmosphere. More specifically, it is necessary that the sintering temperature and nitrogen gas pressure should be set so that the nitrogen pressure is higher than the equilibrium pressure of decomposition of silicon nitride at the set sintering temperature. Preferably, oxygen or SiO is introduced into the atmosphere, and the gas pressure is set at a level higher the equilibrium vapor pressure of SiO in the reaction of silicon nitride with SiO₂ at the sintering temperature, that is, the reaction represented by the following formula (1):

$$Si_3N_4 + 3SiO_2 \rightarrow 6SiO \uparrow + 2N_2 \uparrow \quad (1)$$

By this procedure, the N₂ pressure of the atmosphere can be reduced, and inhibition of densification by trapping of a high-pressure gas in pores of the sintered body at the sintering can be prevented. Introduction of SiO is accomplished by forming SiO at the sintering step by arranging mixed powder of silicon nitride and SiO₂, SiO₂ powder, SiO powder or mixed powder of Si powder and SiO₂ powder in a sintering furnace together with the molded body.

In connection with the sintering pattern, in the case where the amount of β-Si₃N₄ is smaller than 30% by weight, if the temperature is elevated to 1800° C. at a stroke, because of abrupt growth of grains by conversion of the α-phase to the β-phase, densification becomes difficult. If β-Si₃N₄ is contained in an amount of 30% by weight or more, the temperature can be substantially continuously elevated to 1800° C. or higher from the start of the temperature elevation without abrupt growth of grains, and hence, the sintering time can be much shortened.

The finally obtained sintered body consists of a phase of crystal grains having a β-Si₃N₄ content of at least 90% and a phase of the grain boundary, and the grain boundary phase can be a vitreous phase or crystal phase.

The present invention will now be described in detail with reference to the following examples that by no means limit the scope of the invention.

EXAMPLE 1

α-Si₃N₄ powder having a specific surface area of 14 m²/g and an oxygen content of 1 to 2% by weight or less was mixed with a compound of at least one element selected from the group consisting of Sc, Yb, Er, Ho and Dy optionally together with at least one member selected from the group consisting of compounds of elements of the group VIb of the periodic table, Al and Y, or with Y₂O₃ alone for comparison, and SiO₂ was appropriately added to the mixture for the adjustment of the amount of excessive oxygen. The respective components were mixed for 24 hours in a ball mill, and the obtained slurry was dried and granulated and then press-molded. The binder was removed in vacuum and sintering was carried out in a nitrogen-containing non-oxidizing atmosphere maintained at 1600° to 2300° C. under conditions shown in Table 1 to obtain samples 1 through 26.

With respect to each sample, 10 test pieces were prepared. The flexural strength was measured at normal temperature and 1400° C. according to the 4-point bending method of JIS R-1601, and the weight increases (mg/cm²) after standing at 1000° C. for 100 hours and after standing at 1400° C. for 24 hours, that is, the oxidation resistances at medium and high temperatures, were determined. The obtained results are shown in Table 1.

Incidentally, the amount of excessive oxygen was determined by measuring the total oxygen amount by using an apparatus for simultaneous analysis of oxygen and nitrogen, supplied by LECO Co., measuring the amount of the compound of the element of the group IIIb in the sintered body, calculating the amount of oxygen in the oxide based on the measured value of the compound of the element of the group IIIb and subtracting this oxygen amount from the total oxygen amount.

At the above-mentioned 4-point bending flexural strength tests at normal temperature and 1400° C., the deviation of the flexural strength from the mean value in each sample was examined.

The crystal phase formed in the sintered body was identified by the X-ray diffractometry. Namely, the main crystal phase having a peak of a largest intensity among peaks other than the peak of $\beta$-$Si_3N_4$ and crystal phases having other peaks were confirmed. The obtained results are shown in Table 1.

From the results shown in Table 1, it is seen that if $Y_2O_3$ customarily used is used in a large amount (samples 17 and 26), the average flexural strength is high but the deviation of the measured values and formation of stains are observed in 10 test pieces, and the sintered body is not suitable for the mass production.

In contrast, it is seen that each of the sintered bodies according to the present invention (samples 1 through 13, 19, 20, 21, 23 and 25) has excellent characteristics, and it is confirmed that the average flexural strength at room temperature is at least 60 kg/mm$^2$, the average flexural strength is at least 55 kg/cm$^2$, the weight increase by oxidation at the medium temperature (1000° C. ×100 hours) is smaller than 0.15 mg/cm$^2$ and the weight increase by oxidation at the high temperature (1400° C. ×24 hours) is smaller than 0.16 mg/cm$^2$. Furthermore, it is confirmed that in each of the sintered bodies of the present invention, the deviation of the flexural strength either at room temperature or at 1400° C. among 10 test pieces is smaller than ±9 kg/cm$^2$.

In sample 4 where the amount of the compound of the element of the group IIIb was larger than 5 mole % as the oxide, the strength either at normal temperature or at the high temperature and the oxidation resistance were degraded. In sample 15 where the amount of the compound of the element of the group IIIb was smaller than 1 mole % as the oxide, the oxidation resistance was good but the strength was reduced. In sample 18 where the amount of excessive oxygen was larger than 10 mole %, the high temperature strength was drastically reduced. In sample 16 where the excessive oxygen/$M_2O_3$ molar ratio exceeded 2, the high-temperature strength was degraded. In samples 22, 24 and 26 where the compound of the element VIb, Al or Y was added at a level exceeding the predetermined level, the strength or the oxidation resistance was degraded.

From the results of the X-ray diffractometry, it was confirmed that the grain boundary phase of $\beta$-$Si_3N_4$ was composed mainly of YAM (J phase), apatite (H phase) or wollatonite (K phase), and in samples 15 and 18 where the grain boundary phase composed mainly of melilite or disilicate, the strength or oxidation resistance was poor.

TABLE 1

| Sample No. | Composition (mole %) $Si_3N_4$ | $M_2O_3$ | | Amount of Excessive Oxygen (mole %) | Excessive Oxygen/$M_2O_3$ Molar Ratio | Flexural Strength (kg/mm$^2$) room temperature | 1400° C. | Weight Increase (mg/cm$^2$) by Oxidation (1000° C. × 100 hr) | (1400° C. × 24 hr) |
|---|---|---|---|---|---|---|---|---|---|
| 1 | 91.2 | $Sc_2O_3$ | 3.0 | 5.8 | 1.93 | 95 | 61 | 0.01 | 0.08 |
| 2 | 91.1 | $Yb_2O_3$ | 3.0 | 5.9 | 1.97 | 68 | 65 | 0.02 | 0.09 |
| 3 | 91.2 | $Er_2O_3$ | 3.0 | 5.8 | 1.93 | 71 | 63 | 0.02 | 0.17 |
| 4 | 91.3 | $Ho_2O_3$ | 3.0 | 5.7 | 1.90 | 72 | 61 | 0.04 | 0.12 |
| 5 | 91.1 | $Dy_2O_3$ | 3.0 | 5.9 | 1.97 | 78 | 58 | 0.05 | 0.12 |
| 6 | 91.2 | $Sc_2O_3$ $Yb_2O_3$ | 1.5 1.5 | 5.8 | 1.93 | 83 | 55 | 0.03 | 0.11 |
| 7 | 91.6 | $Yb_2O_3$ $Er_2O_3$ | 1.0 2.0 | 5.4 | 1.80 | 75 | 63 | 0.03 | 0.10 |
| 8 | 91.9 | $Dy_2O_3$ $Yb_2O_3$ | 1.0 1.5 | 5.1 | 1.70 | 79 | 63 | 0.03 | 0.11 |
| 9 | 92.8 | $Dy_2O_3$ | 3.0 | 4.2 | 1.40 | 71 | 66 | 0.05 | 0.13 |
| 10 | 94.8 | $Dy_2O_3$ | 3.0 | 2.2 | 0.73 | 69 | 64 | 0.11 | 0.15 |
| 11 | 93.9 | $Dy_2O_3$ | 3.0 | 3.1 | 1.03 | 68 | 65 | 0.15 | 0.15 |
| 12 | 88.6 | $Yb_2O_3$ | 4.0 | 7.4 | 1.85 | 71 | 65 | 0.08 | 0.14 |
| 13 | 85.9 | $Yb_2O_3$ | 5.0 | 9.1 | 1.82 | 62 | 56 | 0.10 | 0.16 |
| 14* | 84.6 | $Yb_2O_3$* | 7.0 | 8.4 | 1.2 | *45 | *48 | *0.35 | *0.24 |
| 15* | 99.4 | $Yb_2O_3$ | *0.4 | 0.2 | 0.4 | 52 | *39 | 0.02 | 0.19 |
| 16* | 90.2 | $Yb_2O_3$ | 3.0 | 6.5 | *2.17 | 68 | *41 | 0.01 | 0.14 |
| 17* | 86.0 | $Y_2O_3$ | 5.0 | 9.0 | 1.8 | 71 | 58 | 0.09 | 0.17 |
| 18* | 83.5 | $Yb_2O_3$ | 5.0 | *11.5 | *2.3 | 79 | *40 | 0.01 | 0.11 |
| 19 | 97.2 | $Yb_2O_3$ | 1.0 | 1.8 | 1.8 | 98 | 58 | 0.09 | 0.08 |
| 20 | 94.3 | $Yb_2O_3$ | 2.0 | 3.7 | 1.85 | 115 | 56 | 0.03 | 0.09 |
| 21 | 96.2 | $Yb_2O_3$ $Cr_2O_3$ | 1.0 0.5 | 2.3 | 1.53 | 96 | 59 | 0.04 | 0.05 |
| 22* | 87.6 | $Dr_2O_3$ $WO_3$ | 3.0 2.0* | 7.4 | 1.48 | *51 | 62 | 0.02 | 0.16 |
| 23 | 91.1 | $Er_2O_3$ $Al_2O_3$ | 3.4 0.5 | 5.0 | 1.28 | 83 | 70 | 0.08 | 0.18 |
| 24* | 90.1 | $Ho_2O_3$ $Al_2O_3$ | 2.7 2.0* | 5.2 | 1.11 | 94 | *42 | 0.12 | *0.38 |
| 25 | 90.6 | $Er_2O_3$ $Yb_2O_3$ $Y_2O_3$ | 1.5 1.5 0.5 | 5.9 | 1.69 | 73 | 61 | 0.09 | 0.11 |
| 26* | 84.2 | $Dy_2O_3$ $Y_2O_3$ | 3.0 3.0* | 9.8 | 1.63 | 67 | 57 | 0.05 | 0.19 |

| Sample No. | Deviation (kg/mm$^2$) room temperature | 1400° C. | Sintering Conditions | Main Crystal Phase | Other Crystal Phase | Crystallinity (%) | Remarks |
|---|---|---|---|---|---|---|---|
| 1 | ±8.1 | ±6.3 | 1950° C. $N_2$ 9.8 atm | — | — | — | |
| 2 | ±6.6 | ±5.2 | " | J | — | 88 | |
| 3 | ±6.9 | ±5.3 | " | H | — | 67 | |
| 4 | ±7.0 | ±6.4 | " | — | — | — | |
| 5 | ±7.9 | ±5.0 | " | — | — | — | |
| 6 | ±8.5 | ±4.3 | " | — | — | — | |

TABLE 1-continued

| 7   | ±7.1  | ±5.8  | "                      | J  | H | 74 |                    |
|-----|-------|-------|------------------------|----|---|----|--------------------|
| 8   | ±8.2  | ±6.4  | "                      | —  | — | —  |                    |
| 9   | ±6.3  | ±6.0  | "                      | K  | — | —  |                    |
| 10  | ±5.9  | ±6.5  | "                      | K  | — | —  |                    |
| 11  | ±7.0  | ±6.3  | "                      | —  | — | —  |                    |
| 12  | ±7.8  | ±7.0  | "                      | J  | H | 80 |                    |
| 13  | ±6.5  | ±5.6  | "                      | "  | — | 76 |                    |
| 14* | ±5.5  | ±6.3  | "                      | "  | — | —  |                    |
| 15* | ±5.8  | ±4.4  | "                      | M  | — | —  |                    |
| 16* | ±7.2  | ±4.7  | "                      | —  | — | —  |                    |
| 17* | *±9.6 | *±14.0| "                      | —  | — | —  | formation of stains|
| 18* | ±6.0  | ±5.0  | 1950° C. $N_2$ 9.8 atm | MS | — | —  |                    |
| 19  | ±6.2  | ±5.0  | 1900° C. $N_2$ 1800 atm| J  | — | 72 |                    |
| 20  | ±7.0  | ±5.9  | "                      | "  | — | 85 |                    |
| 21  | ±5.2  | ±4.2  | 1900° C. $N_2$ 1800 atm HIP | " | — | — |              |
| 22* | ±6.6  | ±5.4  | 1950° C. $N_2$ 9.8 atm GPs | — | — | — |               |
| 23  | ±4.1  | ±3.3  | 1950° C. $N_2$ 10 atm GPs | J | — | — |                |
| 24* | ±3.6  | ±3.0  | "                      | —  | — | —  |                    |
| 25  | ±5.7  | ±4.9  | 1950° C. $N_2$ 9.8 atm GPs | H | — | — |                |
| 26* | *±9.8 | *±8.6 | "                      | —  | — | —  | formation of stains|

EXAMPLE 2

Silicon powder having a purity of 99.99% and a particle size smaller than 350 mesh and silicon nitride powder having an $\alpha$-$Si_3N_4$ content of at least 80% and an average particle size of 0.5 μm were mixed with predetermined amounts of compounds of elements of the groups IIIb and VIb of the periodic table shown in Table 2, and the powders were mixed in methanol in a ball mill for 24 hours and the mixture was cast-molded to obtain a board having a size of 60 mm×60 mm×30 mm.

The molded body was nitrided for 4 hours under nitrogen gas pressure and temperature conditions shown in Table 2.

The nitrided molded body was subjected to the gas pressure sintering at 1970° C. under a nitrogen pressure of 10 atmospheres.

The theoretical specific nitriding ratio was calculated from the weight increase (measured value) after the nitriding step and the weight increase (theoretical value) after the nitriding step, calculated based on the amount of silicon. A test piece was cut out, from the nitrided sample, and the specific gravity after the nitriding step was measured. The test piece cut from the center of the nitrided body was pulverized and the presence or absence of residual Si was confirmed by the powder X-ray diffractometry. A test piece specified in JIS R-1601 was taken out from the final sintered body and the 4-point bending flexural strength was measured at 1370° C. The obtained results are shown in Table 3. The sintering shrinkage (sintered body/molded body) was calculated from the change of the size between the molded body and the sintered body.

The amount of excessive oxygen in the final sintered body and the crystal phase of the grain boundary of $\beta$-$Si_3N_4$ were determined in the same manner as described in Example 1.

As is apparent from Table 2, if the nitriding was carried out in an $N_2$ atmosphere of atmospheric pressure (sample 7) as in the conventional technique, the nitriding was not substantially advanced, and if the pressure of the $N_2$ atmosphere was higher than 10 atmospheres (samples 5 and 8), closed cells were left in the final sintered body and densification was impossible. If the amount of silicon was too small in the starting composition (sample 10), the shrinkage was large and the intended objects of the present invention could not be attained. If the amount of silicon was too large (sample 6), nitriding was insufficient. If the amount of the sintering aid was too large (sample 13), the high-temperature strength was low and the sintered body could not be used as a high-temperature material.

In contrast to these comparative samples, in the samples of the present invention, a nitriding ratio of at least 93% could be attained at the sintering step, and after the re-sintering step, an excellent sintered body having a shrinkage ratio of at least 88% and a strength of at least 50 kg/mm² at a high temperature of 1400° C. was obtained.

TABLE 2

| No. | Composition (% by weight) Si | $Si_3N_4$ | Sintering aid | | Nitriding Condition Temperature (°C.) | $N_2$ pressure (atm) | Specific granity after Nitriding | Nitriding Ratio (%) | Presence or Absence of Residual Si | Re-sintering Conditions |
|-----|----|------|-------|------|------|----|------|------|---------|---------------------|
| 1   | 20 | 68.7 | $Yb_2O_3$ | 10.9 | 1300 | 5  | 2.33 | 95.3 | absent  | GPS 1970° C. $N_2$ 10 atm |
|     |    |      | $WO_3$    | 0.4  |      |    |      |      |         |                     |
| 2   | 30 | 58.0 | $Yb_2O_3$ | 11.5 | "    | 5  | 2.44 | 96.1 | "       | GPS 1970° C. $N_2$ 10 atm |
|     |    |      | $WO_3$    | 0.5  |      |    |      |      |         |                     |
| 3   | 40 | 47.0 | $Yb_2O_3$ | 12.5 | "    | 5  | 2.55 | 95.8 | "       | GPS 1970° C. $N_2$ 10 atm |
|     |    |      | $WO_3$    | 0.5  |      |    |      |      |         |                     |
| 4   | 40 | "    | $Yb_2O_3$ | 12.5 | "    | 10 | 2.54 | 93.2 | "       | GPS 1970° C. $N_2$ 10 atm |
|     |    |      | $WO_3$    | 0.5  |      |    |      |      |         |                     |
| 5*  | 40 | "    | $Yb_2O_3$ | 12.5 | "    | 40 | 2.57 | 95.9 | "       | GPS 1970° C. $N_2$ 10 atm |
|     |    |      | $WO_3$    | 0.5  |      |    |      |      |         |                     |
| 6*  | 50 | 36.7 | $Yb_2O_3$ | 12.8 | "    | 5  | —    | 70.4 | present | —                   |
|     |    |      | $WO_3$    | 0.5  |      |    |      |      |         |                     |
| 7*  | 40 | 47.3 | $WO_3$    | 0.5  | "    | 1  | —    | 43.9 | "       | —                   |
|     |    |      | $WO_3$    | 0.5  |      |    |      |      |         |                     |
| 8*  | 40 | "    | $WO_3$    | 0.5  | "    | 15 | 2.56 | 95.2 | absent  | GPS 1970° C. $N_2$ 10 atm |
|     |    |      | $WO_3$    | 0.5  |      |    |      |      |         |                     |
| 9   | 20 | 68.7 | $WO_3$    | 0.4  | 1150 | 10 | 2.33 | 95.4 | "       | GPS 1970° C.        |

TABLE 2-continued

| No. | Si | Composition (% by weight) Si$_3$N$_4$ | Sintering aid | | Nitriding Condition Temperature (°C.) | N$_2$ pressure (atm) | Specific granity after Nitriding | Nitriding Ratio (%) | Presence or Absence of Residual Si | Re-sintering Conditions |
|---|---|---|---|---|---|---|---|---|---|---|
| 10* | 15 | 74.0 | WO$_3$<br>Yb$_2$O$_3$ | 0.5<br>10.6 | 1300 | 5 | 2.26 | 95.6 | absent | N$_2$ 10 atm<br>GPS 1970° C.<br>N$_2$ 10 atm |
| 11* | 40 | 47.3 | WO$_3$<br>Yb$_2$O$_3$ | 0.4<br>12.2 | 1500 | 10 | — | — | — | — |
| 12 | 40 | " | WO$_3$<br>Yb$_2$O$_3$ | 0.5<br>12.2 | 1400 | 10 | 2.60 | 96.5 | absent | GPS 1970° C.<br>N$_2$ 10 atm |
| 13* | 40 | 41.0 | Yb$_2$O$_3$<br>WO$_3$ | 18.2<br>0.8 | 1300 | 5 | 2.63 | 95.4 | " | GPS 1970° C.<br>N$_2$ 10 atm |
| 14 | 40 | 46.7 | Yb$_2$O$_3$<br>WO$_3$<br>ZrO$_2$ | 12.1<br>0.5<br>0.7 | " | " | 2.58 | 95.8 | — | GPS 1970° C.<br>N$_2$ 10 atm |
| 15 | 40 | 46.7 | Yb$_2$O$_3$<br>WO$_3$<br>SiO$_2$ | 12.1<br>0.5<br>0.7 | " | " | 2.55 | 95.6 | — | GPS 1970° C.<br>N$_2$ 10 atm |

TABLE 3

| Sample No. | Composition (mole %) Si$_3$N$_4$ | Sintering aid M$_2$O$_3$ | WO$_3$ | Excessive Oxygen (mole %) | Excessive Oxygen/ M$_2$O$_3$ Molar ratio | Specific gravity | Shrinkage Ratio(%) |
|---|---|---|---|---|---|---|---|
| 1 | 89.3 | 3.6 | 0.2 | 6.9 | 1.9 | 3.38 | 88.3 |
| 2 | 91.8 | 2.7 | 0.2 | 5.3 | 1.96 | 3.38 | 89.7 |
| 3 | 92.5 | 2.6 | 0.2 | 4.7 | 1.8 | 3.38 | 91.0 |
| 4 | 92.5 | 2.6 | 0.2 | 4.7 | 1.8 | 3.26 | 91.2 |
| 5* | 92.4 | 2.6 | 0.2 | 4.8 | 1.85 | *2.65 | 98.2 |
| 6* | — | — | — | — | — | — | — |
| 7* | — | — | — | — | — | — | — |
| 8* | 92.2 | 2.6 | 0.2 | 5.0 | 1.92 | 3.20 | 91.1 |
| 9 | 91.9 | 2.8 | 0.2 | 5.1 | 1.82 | 3.39 | 88.4 |
| 10* | 97.2 | 2.8 | 0.2 | 4.8 | 1.71 | 3.39 | 85.0 |
| 11* | — | — | — | — | — | — | — |
| 12 | 92.1 | 2.7 | 0.2 | 5.0 | 1.85 | 3.39 | 90.8 |
| 13* | 88.6 | 3.8 | 0.2 | 7.4 | 1.95 | 3.15 | 93.2 |
| 14 | 92.7 | 2.5 | 0.2 | 4.6 | 1.85 | 3.39 | 91.0 |
| 15 | 93.5 | 2.6 | 0.2 | 3.7 | 1.42 | 3.39 | 91.2 |

| Sample No. | High-Temperature Strength (Kg/cm$^2$) | Remarks | Main Crystal Phase | Other Crystal Phase | Crystallinity |
|---|---|---|---|---|---|
| 1 | 53.0 | | J | H | 88 |
| 2 | 54.0 | | " | " | — |
| 3 | 53.0 | | " | " | — |
| 4 | 43.0 | | " | " | — |
| 5* | *15.0 | closed cell ratio of 1.0% after nitriding | — | — | — |
| 6* | — | | — | — | — |
| 7* | — | | — | — | — |
| 8* | *31.3 | closed cell ratio of 0.3% after nitriding | — | — | — |
| 9 | 52.5 | | J | H | 87 |
| 10* | 53.5 | | — | — | — |
| 11* | — | dissolution of Si | — | — | — |
| 12 | 53.5 | | J | H | — |
| 13* | *27.5 | | — | — | — |
| 14 | 52.5 | | J | H | — |
| 15 | 53.0 | | " | " | — |

Note
*outside the scope of the present invention

EXAMPLE 3

Ten kinds of powders shown in Table 4 and FIG. 4 were prepared as the starting silicon nitride powder. With respect to each powder, the average particle size was measured by a centrifugal semimentation type particle size distribution-measuring apparatus (Model SA-CP2 supplied by Shimazu Seisakusho) and the oxygen content was measured by an oxygen analysis apparatus (Model TC-136 supplied by LECO Co.).

A mixture of the starting powder and a sintering aid shown in Table 4 was molded into a size of 5 mm×4 mm×4.5 mm, and the molded body was sintered under conditions shown in Table 4.

With respect to the obtained sintered body, the specific density (ratio to the theoretical density) was measured, and the flexural strength at room temperature and at 1400° C. was measured according to the 4-point bending method. Furthermore, the toughness was measured according to the Vickers indentation method.

The obtained results are shown in Table 5.

Incidentally, the amount of excessive oxygen in the final sintered body and the crystal phase of the grain boundary or β-Si$_3$N$_4$ were determined in the same manner as described in Example 1.

TABLE 4

| Sample No. | Starting Powder No. | β-Conversion (x) (%) | Average Particle Size (y) (μm) | Oxygen Content (% by weight) | Sintering Aid (% by weight) | Sintering Temperature(°C.) | Pressure (Kg/cm²) |
|---|---|---|---|---|---|---|---|
| *1 | *1 | 10 | 0.4 | 1.2 | Er₂O₃ 8 | 1860 | 10 |
| 2 | 2 | 30 | 0.7 | 1.0 | Er₂O₃ 8 | " | " |
| 3 | 3 | " | 0.6 | 1.0 | Er₂O₃ 8 | " | " |
| 4 | 4 | " | 0.7 | 1.1 | Yb₂O₃ 8 | " | " |
| 5 | 5 | 60 | 0.5 | 1.0 | Er₂O₃ 8 | " | " |
| 6 | 6 | " | 0.6 | 1.2 | Yb₂O₃ 8 | " | " |
| 7 | 7 | " | 0.7 | 1.2 | Dy₂O₃ 7 | " | " |
| *8 | *8 | " | 0.9 | 1.0 | Er₂O₃ 8 | " | " |
| 9 | 9 | 70 | 0.5 | 1.1 | Er₂O₃ 8 | " | " |
| 10 | 10 | 90 | 0.7 | 1.1 | Yb₂O₃ 8 | " | " |
| 11 | 5 | 60 | 0.5 | 1.0 | Er₂O₃ 8 | (2000) | 20 |
| 12 | 7 | 60 | 0.7 | 1.2 | Yb₂O₃ 8 | (1700) | (1) |

TABLE 5

| Sample No. | Composition (mole %) of Sintered Body | | Excessive Oxygen (mole %) | Excessive Oxygen/M₂O₃ Molar Ratio | Density (%) to Theoretical Density | Flexural Strength (kg/mm²) | | Toughness (MPam$^{\frac{1}{2}}$) | Main Crystal Phase | Other Crystal Phase | Crystallinity (%) |
|---|---|---|---|---|---|---|---|---|---|---|---|
| | Si₃N₄ | M₂O₃ | | | | room temperature | 1400° C. | | | | |
| *1 | 92 | Er₂O₃ 3 | 5 | 1.67 | 91 | (55) | (38) | 7.5 | H | — | 67 |
| 2 | 92.8 | Er₂O₃ 3.0 | 4.2 | 1.40 | 100 | 65 | 50 | 8.1 | H | — | 72 |
| 3 | 92.8 | Er₂O₃ 3.0 | 4.2 | 1.40 | " | 74 | 55 | 8.1 | J | — | 65 |
| 4 | 92.5 | Yb₂O₃ 2.9 | 4.6 | 1.59 | " | 68 | 51 | 7.9 | J | H | 75 |
| 5 | 92.7 | Er₂O₃ 3.0 | 4.3 | 1.43 | " | 93 | 61 | 8.2 | J | — | — |
| 6 | 92.0 | Yb₂O₃ 2.7 | 5.3 | 1.96 | " | 83 | 59 | 8.1 | H | J | 34 |
| 7 | 92.5 | Dy₂O₃ 2.6 | 4.9 | 1.88 | " | 74 | 56 | 7.9 | H | — | — |
| *8 | 92.7 | Er₂O₃ 2.9 | 4.4 | 1.52 | 91 | (53) | (37) | 5.4 | H | Y | — |
| 9 | 92.4 | Er₂O₃ 2.9 | 4.7 | 1.62 | " | 92 | 65 | 8.2 | H | K | — |
| 10 | 93.1 | Yb₂O₃ 2.7 | 4.2 | 1.56 | " | 83 | 59 | 8.0 | J | H | — |
| 11 | 93.0 | Er₂O₃ 2.9 | 4.1 | 1.41 | 100 | 82 | 61 | 7.9 | H | — | — |
| *12 | 93.2 | Yb₂O₃ 2.7 | 4.1 | 1.52 | 75 | (45) | (20) | (6.0) | J | H | — |

Note
*outside the scope of the present invention

As is apparent from Table 5, sample 8 prepared from starting powder 8 (Table 4) in which the β-conversion was higher than 30% and within the range specified in the present invention but the particle size was larger than 0.9 μm and outside the range specified in the present invention was defective in that sintering was insufficient, the flexural strength was low (53 kg/mm² at normal temperature and 37 kg/mm² at 1400° C.), and the toughness was as low as 5.4 MPam$^{\frac{1}{2}}$. Sample 1 prepared by using starting powder 1 having a β-conversion lower than 30% (Table 4) was defective in that sintering was insufficient, the specific density to the theoretical density was low and the flexural strength was low. In sample 12 where the starting powder was within the scope of the present invention but sintering was carried out below 1800° C. without application of any pressure, densification was not sufficiently effected and the flexural strength were poor.

However, in samples 2 through 7 and 9 through 11 prepared by using starting powders 2 through 7 and 9 and 10 included within the scope of the present invention, the densification was effected substantially to the theoretical density, and the flexural strength was as high as 60 to 88 kg/mm² at normal temperature and 50 to 65 kg/mm² at 1400° C. and the toughness was as high as 7.9 to 8.2 Mpam$^{\frac{1}{2}}$.

As is understood from FIG. 4 and Table 4 and 5, the following flexural strength at normal temperature was obtained according to the relation between the β-convention (%) (x) and the particle size (μm) (y) if the β-conversion was in the range of from 30 to 100%.

at least 60 kg/mm²: $y \leq \frac{1}{250} x + 0.6$ (below line A − B)

at least 70 kg/mm²: $y \leq \frac{1}{250} x + 0.5$ (below line C − D)

at least 80 kg/mm²: $y \leq \frac{1}{250} x + 0.4$ (below line E − F)

at least 90 kg/mm²: $y \leq \frac{1}{250} x + 0.3$ (below line G − H)

We claim:

1. A process for the preparation of a silicon nitride sintered body, which comprises molding a mixed powder comprising as the main component a mixture comprising 45 to 70% by weight of silicon nitride powder, 20 to 40% by weight of silicon powder and 10 to 15% by weight of a compound of an element of the group IIIb of the periodic table, nitriding the silicon at a temperature of 1150° to 1400° C. under a nitrogen pressure of 2 to 10 atmospheres, and re-sintering the nitrided body in a nitrogen atmosphere maintained at 1700° to 2100° C. to increase the density.

2. A process according to claim 1, wherein the compound of the element of the group IIIb of the periodic table is a compound of at least one element selected from the group consisting of Sc, Yb, Er, Ho and Dy.

3. A process for the preparation of a silicon nitride sintered body, which comprises molding a mixed powder comprising as the main component a mixture comprising 45 to 70% by weight of silicon nitride powder, 20 to 40% by weight of silicon powder, 10 to 15% by weight of a compound of the group IIIb of the periodic table and 1 to 1.5% by weight of a compound of the group VIb of the periodic table, nitriding said silicon at a temperature of 1150° to 1400° C. under a nitrogen pressure of 2 to 10 atmosphere, and re-sintering the nitrided body in a nitrogen atmosphere maintained at 1700° to 2100° C. to increase the density.

4. A process according to claim 3, wherein the compound of the element of the group VIb of the periodic table is tungsten oxide ($WO_3$).

5. A process according to claim 1, wherein the silicon nitride powder is $\beta$-$Si_3N_4$.

6. A process according to claim 3, wherein the silicon nitride powder is $\beta$-$Si_3N_4$.

* * * * *

UNITED STATES PATENT AND TRADEMARK OFFICE
CERTIFICATE OF CORRECTION

PATENT NO. : 5,219,500
DATED : June 15, 1993
INVENTOR(S) : Shoji Kousaka et al

It is certified that error appears in the above-indentified patent and that said Letters Patent is hereby corrected as shown below:

On the title page, item [75] Inventors: the following inventors should be added:
--[75] Inventors:  Masahiro Sato; Shoji Kousaka;
Tatsumi Maeda; Kiyoshi Yokoyama;
Masafumi Matsunaka, all of
Kokubu, Japan --.

Signed and Sealed this

Twenty-second Day of February, 1994

Attest:

BRUCE LEHMAN

*Attesting Officer*  *Commissioner of Patents and Trademarks*